United States Patent [19]

Ohnuki et al.

[11] Patent Number: 4,792,669
[45] Date of Patent: Dec. 20, 1988

[54] FOCUS DETECTING DEVICE HAVING TWO SELECTIVELY MOVABLE LENSES

[75] Inventors: Ichiro Ohnuki, Tokyo; Yasuo Suda, Yokohama; Akira Ishizaki, Yokohama; Akira Akashi, Yokohama; Keiji Ohtaka; Takeshi Koyama, both of Tokyo, all of Japan

[73] Assignee: Canon Kabushiki Kaisha, Tokyo, Japan

[21] Appl. No.: 947,822

[22] Filed: Dec. 30, 1986

[30] Foreign Application Priority Data

Jan. 10, 1986 [JP] Japan .................................. 61-003004
Jan. 10, 1986 [JP] Japan .................................. 61-003006

[51] Int. Cl.$^4$ .............................................. G01J 1/20
[52] U.S. Cl. ...................................... 250/201; 354/406
[58] Field of Search ............... 354/400, 402, 403, 404, 354/405, 406, 407, 408; 356/4, 376; 250/201 PF, 201 AF, 201 R, 204

[56] References Cited

U.S. PATENT DOCUMENTS

| | | | |
|---|---|---|---|
| 4,359,282 | 11/1982 | Garrison | 356/376 |
| 4,497,561 | 2/1985 | Suzuki | 354/406 |
| 4,523,101 | 6/1985 | Tsunekawa | 250/201 PF |
| 4,536,070 | 8/1985 | Shono | 354/402 |
| 4,561,750 | 12/1985 | Matsumura | 354/406 |
| 4,563,576 | 1/1986 | Matsumura et al. | 354/406 |
| 4,573,784 | 3/1986 | Suzuki | 354/406 |
| 4,580,042 | 4/1986 | Tokutomi et al. | 250/201 PF |
| 4,659,917 | 4/1987 | Suzuki et al. | 250/201 |
| 4,686,360 | 8/1987 | Gorgon | 250/201 PF |
| 4,694,151 | 9/1987 | Yoshimura | 250/201 PF |

Primary Examiner—David C. Nelms
Assistant Examiner—Jessica Ruoff
Attorney, Agent, or Firm—Fitzpatrick, Cella, Harper & Scinto

[57] ABSTRACT

A focus detecting device which is provided with a field lens disposed on the predetermined imaging plane of an objective lens and a plurality of imaging lenses disposed rearwardly of the field lens and in which the images of the imaging lenses are sensed to thereby determine the focus adjusted state of the objective lens. A unit body integrally constitutes the units such as the field lens and the imaging lenses and has a surface for movably supporting the field lens. The unit body also has adjusting device for rotating the imaging lenses relative to the optical axis.

9 Claims, 7 Drawing Sheets

FOCUS DETECTING DEVICE HAVING TWO SELECTIVELY MOVABLE LENSES

BACKGROUND OF THE INVENTION

1. Field of the Invention

This invention relates to a focus detecting device used in a still cameras, etc. and in particular, to the assembly adjusting mechanism thereof.

2. Related Background Art

A focus detecting device in which the object light having passed through a photo-taking lens is directed onto a photoelectric conversion element through a focus detecting optical system and the focus adjusted state of the lens is detected on the basis of the output of the photoelectric conversion element is well known. This focus detecting optical system comprises, for example, a field lens disposed near the predetermined focal plane of the photo-taking lens, two imaging lenses disposed rearwardly thereof, etc., and a line sensor, comprising a photoelectric conversion element, disposed rearwardly of the optical system. Focus detection is accomplished by finding the correlation between two images formed on the line sensor by the two imaging lenses.

Now, the units such as the field lens and the imaging lenses are usually fixedly fitted to a unit body for focus detection, and the mutual adjustment of those units is little known. For example, Japanese Laid-Open Patent Application No. 39612/1985 discloses a technique whereby when effecting pupil adjustment or the like, each unit is not moved but the unit body is moved as a unit. However, the secondary imaging lens, the field lens, etc. are fixedly fitted to the unit body, and each unit has little freedom for adjustment. Nevertheless, each unit is not always appropriately fixed to the unit body including a sensor, and for example, the following problem arises in some cases.

FIG. 10 of the accompanying drawings shows the images formed on the sensor. Reference characters 31a and 31b designate a pair of sensor portions, and reference characters 30a and 30b denote projected images. When the sensor or the secondary imaging system is somewhat rotated as shown, different portions of an object to be photographed are distance-measured, and this cannot be an said to be accurate distance measurement, and the adjustment thereof becomes impossible. That is, an attempt to fixedly fit and dispose each unit at an appropriate location would require accuracy of the design or manufacture thereof.

U.S. Pat. No. 4,391,513 is mentioned as a known art.

SUMMARY OF THE INVENTION

It is a first object of the present invention to provide a focus detecting mechanism in which an optical system for focus detection is given a degree of freedom of adjustment to enable fine adjustment and thus, more accurate focus detection to be accomplished.

It is a second object of the present invention to provide, under the first object, a movement space in which a field lens disposed near the predetermined focal plane of the photo-taking lens may shift, for example, for the adjustment of pupil alignment.

It is a third object of the present invention to rotate a secondary imaging lens to prevent, for example, the lock conformity between the imaged states of two images.

Further objects of the present invention will become apparent from the following detailed description taken in conjunction with the accompanying drawings.

DESCRIPTION OF THE PREFERRED EMBODIMENTS

Figure 1:
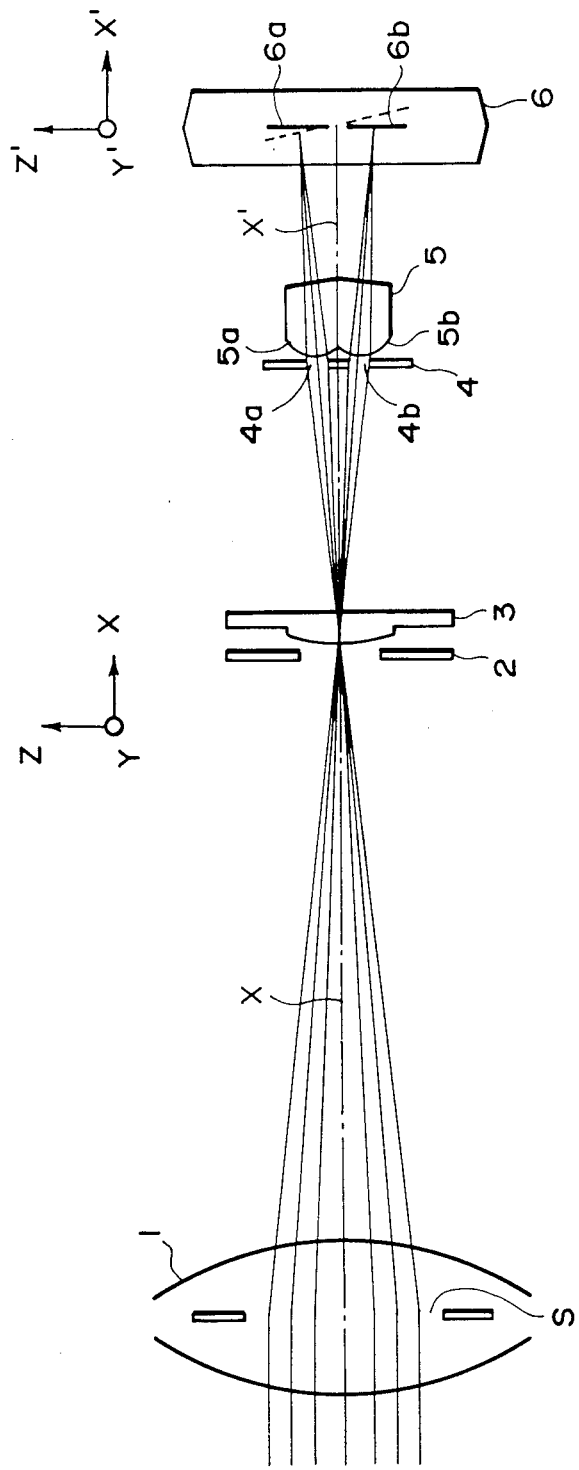
FIG. 1 shows an optical system for illustrating a focus detecting device according to the present invention.

The present invention will hereinafter be described in detail with respect to some embodiments thereof shown in the drawings.

Referring to FIG. 1, which shows the basic construction of an optical system according to the present invention, reference numeral 1 designates a photo-taking lens, and along the optic axis thereof there are disposed in succession a view field mask 2, a field lens 3 on a predetermined imaging plane, a diaphragm 4 having two openings 4a and 4b symmetrical with respect to the optic axis, a secondary imaging lens assembly 5 comprising two positive lens elements 5a and 5b, and a line sensor 6 comprising two photoelectric element arrays 6a and 6b. X denotes the optical axis of the photo-taking lens 1, and and X' designates an extension axis of the optical axis. The extension axis X' is parallel to the optical axes of the positive lens elements.

The view field mask 2 prevents any unnecessary light beam outside the distance measurement view field from entering a focusing device system, and the field lens 3 serves to place the openings 4a and 4b of the diaphragm 4 and the exit pupil S of the photo-taking lens 1 into an imaging relation and thereby effectively direct the light beam passed through the photo-taking lens 1 to the line sensor 6. The diaphragm 4 is for limiting the light beam, and the two positive lens elements 5a and 5b of the secondary imaging lens assembly 5 serve to re-image the light beams passing through different areas of the exit pupil S of the photo-taking lens 1 on the line sensor 6. The correlation between the positions of the two images re-formed by the secondary imaging lens assembly 5 is found from the outputs of the two arrays 6a and 6b of the line sensor 6, whereby the amount of defocus is detected. The secondary imaging lens assembly 5 forms secondary images having a parallax on the photoelectric element arrays of the line sensor 6 from the light beams that have passed through different areas of the exit pupil S of the photo-taking lens 1.

Figure 2:
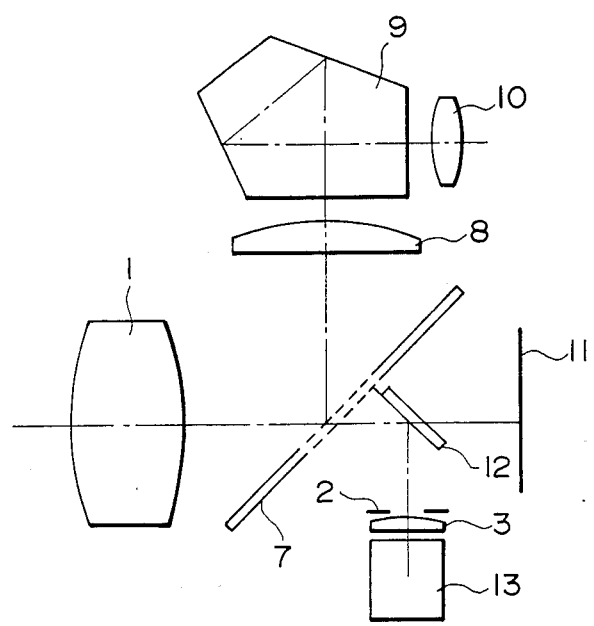
FIG. 2 shows the basis construction of the focus detecting device according to the present invention.
Figure 3:
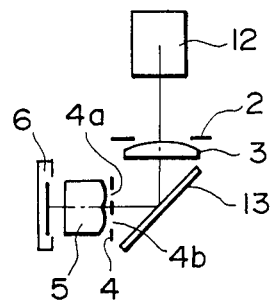
FIG. 3 is a view of the FIG. 2 construction as seen from the side thereof.

FIG. 2 is a cross-sectional view of a focus detecting system according to the present invention as applied to a single lens reflex camera. A quick return mirror 7 is disposed behind the photo-taking lens 1 so that the light beam upwardly reflected thereby is directed to a finder system comprising a condenser lens 8, a penta roof type prism 9 and an eyepiece lens 10. A photosensitive film 11 or a solid state image pickup device is disposed rearwardly of the quick return mirror 7 and constitutes a photo-taking system with the photo-taking lens 1. A sub-mirror 12 is attached to the back of the light-transmitting portion of the quick return mirror 7 and is adapted to jump up or return with the quick return mirror 7. As shown in the cross-sectional view of FIG. 3 which is a view of the focusing optical system of FIG. 2 as seen from the side thereof, the view field mask 2 disposed near the predetermined imaging plane of the photo-taking lens 1, the field lens 3, a mirror 13 for bending the optical path, the diaphragm 4 having two openings 4a and 4b symmetrical with respect to the optic axis, the secondary imaging lens assembly 5 and the line sensor 6 are arranged in succession on the reflection side of the sub-mirror 12.

A description will now be provided on an embodiment in which adjustment of a device for moving chiefly the field lens is effected.

Figure 4:
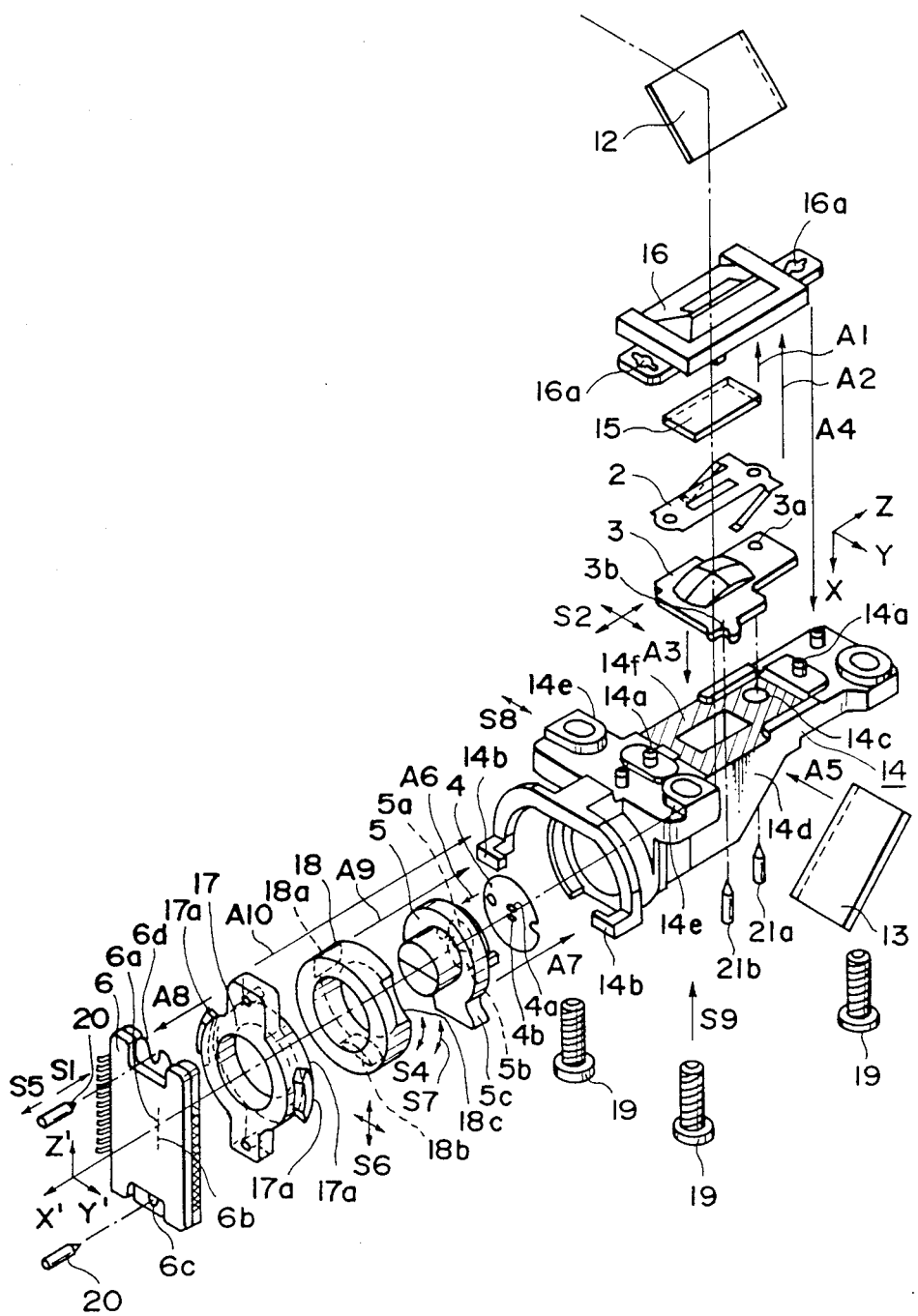
FIG. 4 shows an exploded prespective view of the specific construction of the unit body of the present invention.

FIG. 4 is an exploded perspective view showing a specific example of the construction of a focusing unit. This focusing unit is such that all optical members up to the one which directs the photo-taking light beam reflected by the sub-mirror 12 shown in FIGS. 2 and 3 to the line sensor 6 are mounted in a single unit body 14. An infrared cut filter 15 and an anti-reflection member 16 are inserted between the sub-mirror 12 and the view field mask 2, and the anti-reflection member 16 is for preventing the reflected light on the surface of the infrared cut filter 15 from arriving at the film 11. A fixed stage 17 and a rotatable stage 18 are disposed forwardly of the line sensor 6, the unit body 14 is fixed to the bottom plate (not shown) of a camera by means of mounting screws 19, the line sensor 6 is tentatively held on the fixed stage 17 by means of sensor holding pins 20, and the field lens 3 is adjustable for movement on a plane above the unit body 14 and perpendicular to the photo-taking optic axis by field lens adjusting pins 21a and 21b.

The procedures of assembly of the focusing unit will now be described in accordance with the procedures indicated by arrows A1, A2, A3, ... in FIG. 4.

A1: the infrared cut filter 15 is attached (bonded) to the anti-reflection member 16.

A2: The view field mask 2 is attached to the infrared cut filter 15.

A3: The field lens 3 is placed onto the unit body 14. The unit body 14 has a surface 14f parallel to the plane Z-Y, and the field lens 3 is movable on this surface. Also, the bent portion 2a of the view field mask 2 tentatively holds down the field lens.

A4: The hole 16a in the anti-reflection mask 16 is forced onto the dowel 14a of the unit body 14, whereby the cut filter 15 is incorporated into the unit body 14.

A5: The mirror 13 is attached to the unit body 14.

A6: The diaphragm 4 is attached to the secondary imaging lens 5.

A7: The positioning portion 5c of the secondary imaging lens 5 is pushed against the unit body 14, and the secondary imaging lens 5 is incorporated into the unit body 14 while the positioning in the direction of rotation is effected.

A8: The fixed stage 17 is attached to the line sensor 6.

A9: The rotatable stage 18 is mounted on the unit body 14.

A10: The fixed stage 17 is incorporated into the unit body 14 in such a manner that the fixed stage 17 embraces the rotatable stage 18, and the protrusion 17a of the fixed stage 17 is tentatively held by the engaging portions 14b of the unit body 14.

The procedures of adjustment will now be described in accordance with arrows S1–S9 (S3 being not shown) in FIG. 4. The unit body 14 is first mounted on an adjustment tool, not shown, and then adjustment is effected by the following procedures.

S1: Sensor holding pins 20 from the adjustment tool are inserted into the hole 6c and cut-away hole 6d in the line sensor 6 to thereby control the movement of the line sensor 6 on the plane Y'-Z' relative to the unit body 14.

S2: Pupil alignment, i.e., alignment of the optic axis of the focusing unit with the optic axis of the camera body, is effected. This is the adjustment for properly projecting the openings 4a and 4b of the diaphragm 4 into the exit pupil S of the photo-taking lens 1 by the field lens 3. Actually, field lens adjusting pins 21a and 21b are inserted into the hole 3a and the cut-away hole 3b in the field lens 3 through the inside of the through-hole 14c in the unit body 14 and the outside of the side wall 14d of the unit body 14, respectively, and the field lens 3 is delicately made parallel and eccentric and is held at a desired position, whereafter it is adhesively fixed. The adhesive agent used may suitably have low surface tension and is brought into the contact surfaces of the two by being poured in from the side thereof. The diameter of the hole 14c is larger than the diameter of the pin 21a. A mirror box for a tool and an exit pupil for the tool are used as the adjustment standard in this case.

S3: Although not shown, shading correction is effected by the use of a surface chart of uniform brightness, and the irregularity of the quantity of light on the line sensor 6 and the irregularlity of the sensitivity of the line sensor 6 are collectively corrected with the EEPROM of a signal processing circuit, not shown being set.

S4: The rotatable stage 18 is chucked by a tool, not shown, and is rotated about the axis X', whereby the line sensor 6 and the fixed stage 17 are rocked together about the axis Y' and adjustment of the inclination of the line sensor 6 is accomplished. The principle of this adjusting method will later be described in relation to FIG. 5. After this adjustment, the fixed stage 17 and the rotatable stage 18 are bounded to each other and fixed.

S5: The sensor holding pins 20 are withdrawn.

S6: The chucking of the rotatable stage 18 is left as it is, and the rotatable stage 18 is moved parallel in the plane Y'-Z', and the centering of the line sensor 6 is effected with the center of the line sensor 6 aligned with the optical axis.

S7: The rotatable stage 18 is rotated and the adjustment of the rotation of the line sensor 6 about the axis X' is effected, and the line sensor 6 is adjusted in the direction of the axis Z', whereby adjustment of squint is accomplished.

The adjustment as the focusing unit is completed by the above-described procedures S1–S7 and thus, the focusing unit is detached from the adjustment tool, and then the following adjustments S8 and S9 are effected.

S8: To make the distance measurement center coincident with the center of the distance measurement frame in the finder when the focusing unit is mounted on the bottom plate of the camera, the entire focusing unit is moved in the direction of the axis Y to thereby adjust the parallax. A groove which fits to the mounting seat 14e of the unit body 14 is provided in the mounting portion of the bottom plate of the camera and therefore, in this case, the focusing unit is moved parallel with the groove as a guide.

S9: The unit body 14 is fixed to the bottom plate of the camera by means of the mounting screws 19, whereafter the focus of the focusing unit is electrically brought into coincidence by the use of the EEPROM.

The adjustment of the inclination of the line sensor 6 in the aforedescribed procedure S4 and the principle thereof will now be described in detail. In FIG. 4, the concave surface 18a around the rotatable stage 18 is chucked by the three pawls of a jig, not shown, and the rotatable stage 18 is rotated about the axis X'. In this case, the contact surfaces 17b and 18b of the fixed stage 17 and rotatable stage 18 are parellel to each other and are inclined by a predetermined angle with respect to a plane perpendicular to the optical axis. Since the fixed stage 17 and the line sensor 6 have their rotation controlled by the sensor holding pins 20, the fixed stage 17 and the rotatable stage 18 are rotatably adjusted together about the axis Y' by rotating only the rotatable stage 18.

Figure 5A:
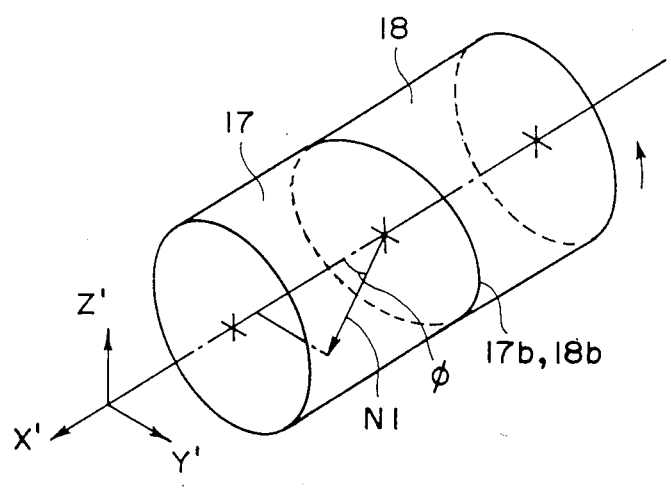
FIGS. 5A and 5B illustrate the principle of the adjustment of the inclination of a line sensor.
Figure 5B:
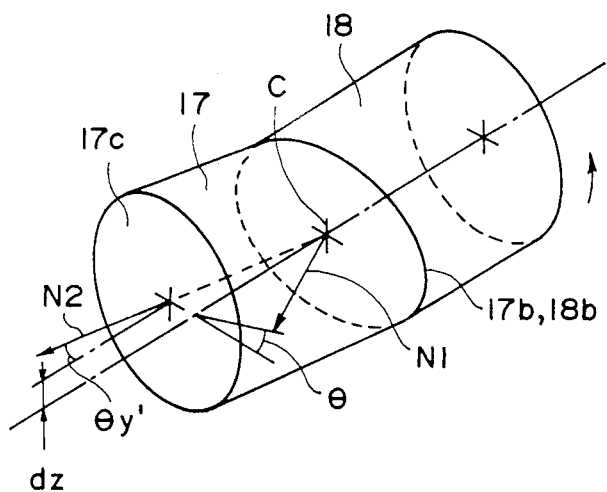

The principle thereof is illustrated in FIG. 5A. The respective contact surfaces 17b and 18b of the fixed stage 17 and rotatable stage 18 are inclined with respect to the plane perpendicular to the optical axis, as previously described, and therefore, the angle of inclination of the normal N1 of the contact surface 18b with respect to the optical axis is tentatively defined as $\phi$. In the initial position of the fixed stage 17, the normal N1 is in the plane X'-Y'. When only the rotatable stage 18 is rotated counter-clockwise by an angle $\theta$, the fixed stage 17 begins to be inclined with respect to the optical axis as shown in FIG. 5B, and the inclination thereof is represented by the angle of inclination $\theta y'$ of the normal N2 in the surface 17c of the fixed stage 17 with respect to the optical axis. The fixed stage 17 is shown to swivel about a point C at which the optical axis intersects the contact surfaces 17b and 18b and therefore, the surface 17c shifts by dz in the direction of the axis Z', but since actually the fixed stage 17 and the line sensor 6 are controlled by the sensor holding pins 20, generation of the amount of shift dz is negated by the sliding between the contact surfaces 17b and 18b in the direction of the axis Z' and thus, the center of the line sensor 6 does not deviate from the optical axis.

Figure 6:
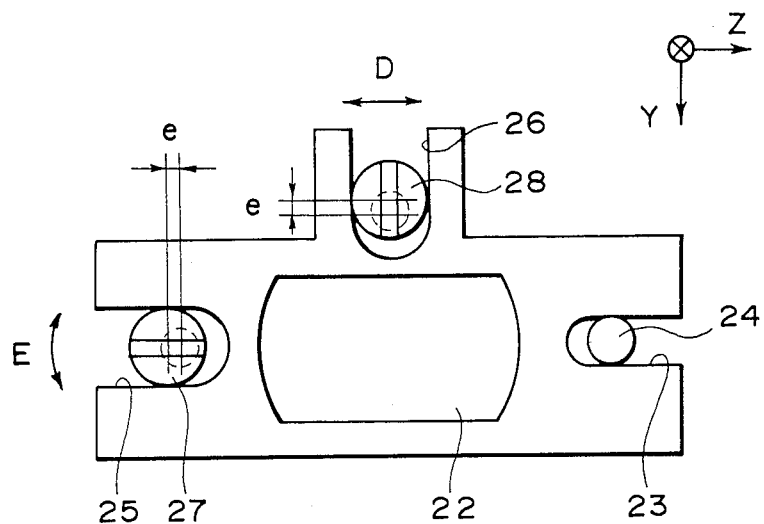
FIG. 6 shows another embodiment of the present invention, and more particularly an adjusting mechanism for a field lens.

The case of a structure in which the adjustment of the eccentricity of the field lens 3 in the above-described embodiment is carried out by the adjusting jig has been shown above, but alternatively, a structure which need not use the adjusting jig may be adopted. FIG. 6 shows an example of such structure. In this case, a guide pin 24 studded in the unit body 14 of FIG. 4 is fitted in a guide groove 23 provided in the lens frame of the field lens 3, and eccentric screws 27 and 28 each having an amount of eccentricity e are fitted in two guide grooves 25 and 26 provided in the lens frame. When, in FIG. 6, the eccentric screw 27 is turned, the field lens 3 is substantially rotated moved about the guide pin 24 in the direction of arrow E and therefore, the center of the field lens 3 effects substantially rectilinear movement in the direction of the axis Y. Also, when the eccentric screw 28 is turned, the field lens 3 is moved parallel in the directions of arrow D. Accordingly, by the adjustment of the rotation of the eccentric screws 27 and 28, the field lens 3 can be made parallel and eccentric in the plane Y-Z independently in the direction of the axis Y and the direction of the axis z, and if such a system is employed, it is possible to adjust the parallelism and eccentricity of the field lens 3 without using any special adjusting jig.

As described above, in the focus detecting device according to the present invention, pupil alignment can finally be adjusted without the whole of the focusing unit being inclined and with only the field lens being moved and therefore, it is not necessary to screw an excess space around the focusing unit as in the prior art, and this is advantageous in making the camera compact.

The foregoing embodiment has been described chiefly about the field lens with the secondary imaging lens fixed, and an embodiment in which both the field lens and the secondary imaging lens are movable will hereinafter be described with reference to FIGS. 7 to 10. The unit body 14', somewhat unlike the unit body 14 in the above-described embodiment, has added thereto a constituent portion in which the imaging lens is rotated.

Also, of the procedures of assembly and the procedures of adjustment, the portions which are substantially similar to those described above will be omitted. Further, description of the rotatable stage and the fixed stage will also be omitted.

A6: The rotation adjusting screw 19 is threadably engaged with the threaded bore 14'd of the unit body 14'.

A7: The diaphragm 4 is attached to the secondary imaging lens 5.

A8: The positioning portion 5c of the secondary imaging lens 5 is pushed against the rotation adjusting screw 19, whereby the positioning of the secondary imaging lens 5 relative to the unit body 14' in the direction of rotation is accomplished.

A9: The line sensor 6 is positioned by the pins 14'e of the unit body 14' being fitted into the mounting holes 6c and 6d, and then is mounted on the unit body 14'.

Figure 7:
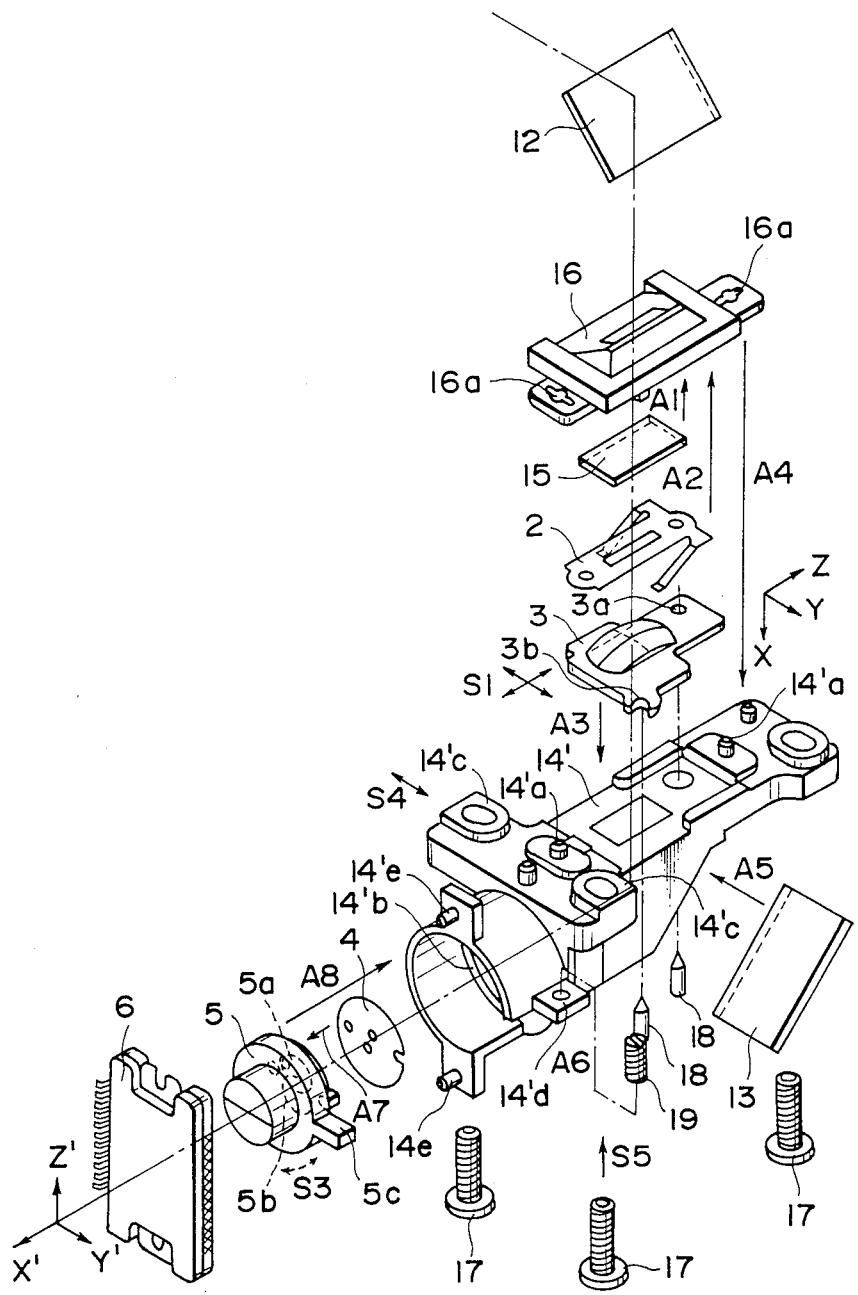
FIG. 7 shows still another embodiment of the present invention, and more particularly the specific construction of the unit body thereof.

The procedures of adjustment will now be described in accordance with arrows S1–S5 (S2 being not shown) in FIG. 7. The entire unit is mounted to an adjustment tool, and the following adjustments S1–S3 are effected.

The adjustments S1 and S2 are similar to those previously described and therefore are omitted.

S3: The secondary imaging lens 5 is biased counter-clockwise as viewed in FIG. 7 by a spring, not shown, and the rotation adjusting screw 19 is turned to change the angle of rotation of the secondary imaging lens 5 relative to the unit body 14' while the positioning portion 5c is urged against the screw 19, whereby correction of squint is accomplished.

The adjustment as the focusing unit is completed by the above-described means and therefore, the focusing unit is removed from the adjustment tool, whereafter the focusing unit is mounted on the bottom plate of the camera.

Figure 8:
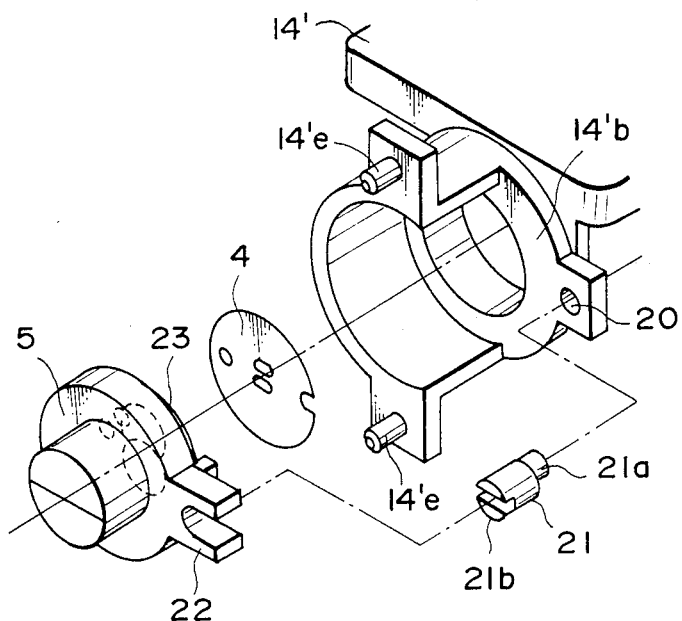
FIG. 8 shows a second embodiment for rotating a secondary imaging lens.

FIG. 8 shows another example of the rotation adjusting mechanism for the secondary imaging lens 5. In FIG. 8, members similar to those in FIG. 7 are given similar reference numerals. In this instance, the eccentric portion 21a of the eccentric pin 21 may be inserted into the hole 20 in the unit body 14', and the head 21b of the eccentric pin 21 may be fitted to the fork portion 22 of the secondary imaging lens 5.

The fitting portion 23 of the secondary imaging lens 5 fits in the hole portion 14'd of the unit body 14' and therefore, when the eccentric pin 21 is rotated, the secondary imaging lens 5 is rotated about the optical axis thereof, whereby the alignment thereof with the line sensor 6 can be accomplished. The rotation adjusting mechanism for the secondary imaging lens 5 may be replaced by any one of various mechanisms using, for example, a cam or the like.

Figure 9:
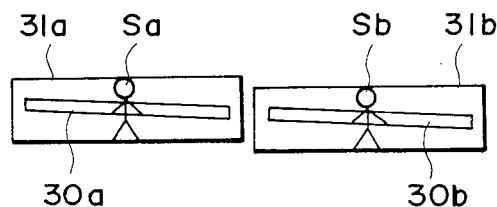
FIG. 9 shows the secondary imaging lens when rotatably adjusted.
Figure 10:
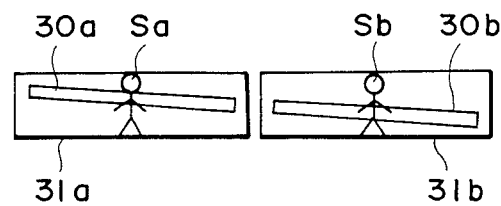
FIG. 10 shows images formed on a line sensor in accordance with the prior art.

In each of the above-described embodiments, if the secondary imaging lens 5 is rotated to adjust the alignment thereof with the line sensor 6 about the optical axis, the image projected onto the line sensor 6 will be such as shown in FIG. 9. That is, even if a pair of line sensors 30a and 30b are somewhat inclined with respect to view field frames 31a and 31b, the line sensors 30a and 30b will distance-measure the same location of object images Sa and Sb and therefore, so-called squint will be eliminated.

The squint is attributable not only to the angular deviation of the line sensor 6, but also to the eccentricity of the secondary imaging lens 5 in some cases and therefore, it is more advisable to effect adjustment by rotating the secondary imaging lens 5 than by rotating the line sensor 6.

As described above, in the focus detecting device according to the present invention, the alignment of a pair of secondary imaging lenses with a corresponding pair of line sensors in the direction of rotation about the optic axis can be adjusted by rotating the small secondary imaging lenses and therefore, the adjusting portion thereof can be made more compact than in the prior art.

We claim:

1. A device for detecting the focus adjustment state of an objective lens, comprising:
   (a) a field lens disposed near the predetermined imaging plane of the objective lens;
   (b) imaging means for re-forming a plurality of images from a light beam emerging from said field lens;
   (c) a sensor for sensing the light intensity distribution of the plurality of images re-formed by said imaging means and producing information about the focus adjustment state of the objective lens based on the relative position of the plurality of images;
   (d) a member having a support surface on which said field lens means is movable,
      wherein movement of said field lens on said support surface facilitates the directing of the light beam emerging from the objective lens to said imaging means.

2. A device according to claim 1, wherein said support surface is a surface substantially perpendicular to the optical axis of the objective lens.

3. A device according to claim 2, further including a unit integrally constituting said imaging means and said sensing means.

4. A device according to claim 3, wherein said member is said unit.

5. A device according to claim 4, wherein after the movement of said field lens means, said field lens means is bonded and fixed to said unit.

6. A device according to claim 4, further comprising a pin for adjusting the movement of said field lens from the outside of said unit.

7. A device for detecting the focus adjustment state of an objective lens, comprising:
   (a) a plurality of imaging means disposed rearwardly of the focal plane of the objective lens for receiving a light beam passed through the objective lens and imaging said light beam;
   (b) a rotator for rotating said imaging means substantially about the optical axis of the objective lens; and
   (c) a sensor for sensing the light beam imaged by said imaging means and producing a signal relating to the focus adjustment state of the objective lens.

8. A device according to claim 7, further including a unit integrally constituting said imaging means, said adjustor and said integrally.

9. A device according to claim 7, wherein said adjustor means is a screw and adjustment of rotation is accomplished by the amount of axial movement thereof.

* * * * *

UNITED STATES PATENT AND TRADEMARK OFFICE
CERTIFICATE OF CORRECTION

PATENT NO. : 4,792,669

DATED : December 20, 1988

INVENTOR(S) : Ohnuki, et al.

It is certified that error appears in the above-identified patent and that said Letters Patent is hereby corrected as shown below:

COLUMN 1
    Line 8, change "in a" to --in--;
    Line 47, change "an said to be" to --said to be an--; and
    Line 67, change "lock conformity" to --lack of conformity--.

COLUMN 2
    Line 8, change "basis" to --basic--.

COLUMN 3
    Line 26, change "on an" to --of an--.

COLUMN 4
    Line 55, change "bounded" to --bound--.

COLUMN 5
    Line 24, change "parellel" to --parallel--.

UNITED STATES PATENT AND TRADEMARK OFFICE
CERTIFICATE OF CORRECTION

PATENT NO. : 4,792,669

DATED : December 20, 1988

INVENTOR(S) : Ohnuki, et al.

It is certified that error appears in the above-identified patent and that said Letters Patent is hereby corrected as shown below:

COLUMN 7
    Line 5, change "14'd" to --14'b--.

COLUMN 8
    Line 5, change "images;" to --images; and--;
    Line 40, change "adjustor and said integrally." to --rotator and said sensor.--;
    Line 41, change "adjus-" to --rota--; and
    Line 42, "means" should be deleted.

Signed and Sealed this

Thirty-first Day of October, 1989

Attest:

DONALD J. QUIGG

*Attesting Officer*    *Commissioner of Patents and Trademarks*